(12) United States Patent
Aoki et al.

(10) Patent No.: US 8,442,322 B2
(45) Date of Patent: May 14, 2013

(54) IMAGE PROCESSING APPARATUS AND NON-TRANSITORY STORAGE MEDIUM STORING IMAGE PROCESSING PROGRAM

(75) Inventors: Yasuhiro Aoki, Kawasaki (JP); Masami Mizutani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 19 days.

(21) Appl. No.: 13/240,564

(22) Filed: Sep. 22, 2011

(65) Prior Publication Data
US 2012/0121127 A1  May 17, 2012

(30) Foreign Application Priority Data
Nov. 12, 2010  (JP) ................................ 2010-254200

(51) Int. Cl.
*G06K 9/18* (2006.01)
(52) U.S. Cl.
USPC ........................................ 382/184; 382/181
(58) Field of Classification Search ................ 382/181, 382/184, 231, 286, 294, 151
See application file for complete search history.

(56) References Cited

U.S. PATENT DOCUMENTS
7,145,556 B2 * 12/2006 Pettersson ..................... 345/179
2001/0012394 A1 * 8/2001 Yoshida ......................... 382/149

FOREIGN PATENT DOCUMENTS
JP          5-258146 A     10/1993
JP         2010-87743 A     4/2010

* cited by examiner

*Primary Examiner* — Edward Park
(74) *Attorney, Agent, or Firm* — Fujitsu Patent Center

(57) ABSTRACT

An image processing apparatus executes acquiring, on a first image having a pattern having first areas and second areas that have a different color from the first areas, center position of the pattern where the first areas and the second areas cross, acquiring boundary positions between the first and second area, converting the first image to a second image having its image distortion corrected by using the center position and the boundary positions, acquiring, by scanning on the second image, expectation values which are areas including the point where the first and second areas cross excluding the center position, acquiring a intersection position of the intersection on the second image based on the expectation values, acquiring the center position and the positions on the first image corresponding to the intersection position by inverting the second image to the first image, determining the points corresponding to the acquired positions as features.

8 Claims, 11 Drawing Sheets

IMAGE PROCESSING APPARATUS AND NON-TRANSITORY STORAGE MEDIUM STORING IMAGE PROCESSING PROGRAM

CROSS-REFERENCE TO RELATED APPLICATION

This application is based upon and claims the benefit of priority of the prior Japanese Patent Application No. 2010-254200, filed on Nov. 12, 2010 the entire contents of which are incorporated herein by reference.

FIELD

The embodiments discussed herein are related to an image processing apparatuses and a non-transitory storage medium storing an image processing program.

BACKGROUND

What-is-called calibration processing is performed in a vehicle or robot having a camera. The calibration processing includes checking the attached position and/or attitude of the camera and calibrates the difference from the designed value or values of the attached position and/or attitude of the camera. In general, the calibration processing is implemented by capturing a marker disposed in a predetermined position within a camera capturing range with the camera and using the position of the marker on the captured image, that is, the coordinates of a feature of the marker appearing in the image.

The marker to be used has a pattern which allows easy extraction of a feature from the captured image with the marker. For example, FIG. 12 illustrates an example of the form of the marker. A publicly known art has been available which allows extraction from a marker M1 having a form as illustrated in FIG. 12 the center of the pattern of the marker, that is, an intersection of boundaries forming different color areas as a feature. Reference may be made to Japanese Laid-open Patent Publication No. 2010-87743.

SUMMARY

According to an aspect of the invention, a non-transitory storage medium stores an image processing program causing a computer to execute processing of: acquiring, on a first image of a captured marker having a pattern formed by a plurality of first areas which has a first color and a plurality of second areas which has a second color that is different from the first color, a position of a first point where the plurality of first areas and the plurality of second areas cross; acquiring, on the first image, a boundary between one of the plurality of the first areas and one of the plurality of the second areas having the first point; converting the first image to a second image having a plurality of pixels to other positions with pixel values by using the position of the first point, the position of a second point present on the boundary and the positions of the plurality of pixels included in the first image and the pixel values of the plurality of pixels; scanning on the second image; acquiring an expectation value indicating a possibility that an intersection where the plurality of first areas and the plurality of second areas cross exists excluding the first point; acquiring the position of the intersection on the second image on the basis of the expectation value; inverting the other positions of the plurality of pixels included in the second image to the corresponding positions on the first image; acquiring the position of the first point and the position of the intersection on the first image; and determining the acquired position of the first point and the position of the intersection as the positions of features of the pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 12:
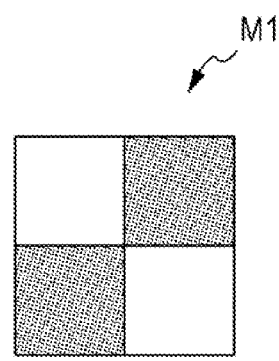
FIG. 12 illustrates an example of the form of the marker.

As described previously, though the calibration processing extracts one feature from the image of captured one marker as illustrated in FIG. 12, for example, a plurality of features may contribute to stable calibration. For that, the calibration processing has been performed by providing a plurality of markers within a predetermined position in the camera capturing range, capturing a plurality of markers with the camera, and extracting features from the markers on the images. However, it may be difficult to prepare places for providing the plurality of markers for the limited areas of the sites of factories. In this case, the calibration may not be executed in a stable manner.

The disclosed art was made in view of the problem above, it is an object of the disclosed art to provide an image processing apparatus which allows stable extraction of a plurality of features from an image of captured one marker.

With reference to drawings, embodiments of the image processing apparatus disclosed in the subject application will be described in detail below. The art disclosed in the subject application is not limited by the embodiments which will be described below of the image processing apparatus disclosed in the subject application. According to the following embodiments, the image processing apparatus disclosed in the subject application, a method will be described which extracts as a feature a plurality of intersections of boundaries forming different color areas from an image of a captured marker (jig) provided at a predetermined position.

First Embodiment

Figure 13:
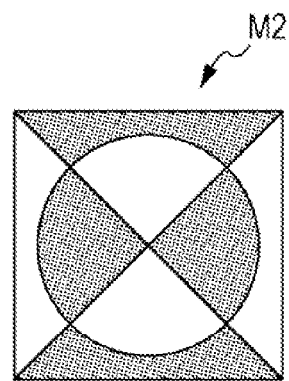
FIG. 13 illustrates an example of the form the marker.

Because a marker M1 illustrated in FIG. 12 is captured with the denotation of the marker M1 in contact with the background, the image of the captured marker M1 desirably has a pattern allowing easy separation thereon between the marker M1 and the background. Accordingly, the form of the marker as illustrated in FIG. 13 may be considered as the form of the marker allowing easier separation from the background than the marker M1 in FIG. 12. FIG. 13 illustrates an example of the form the marker.

The marker M2 having a form as illustrated in FIG. 13 has a circular part and the part surrounding the circular part. The circular part has the center of the pattern, that is, one point within intersections of boundaries forming different color areas as its center. Because the part surrounding the circular part of the marker M2 may eliminate the dependency of the circular part of the marker M2 on the background, an image can be acquired in which the boundary of the circular part of the marker M2 is clear. Because calibration processing using the marker M2 allows easy separation between the marker M2 and the background, the center of the pattern of the circular part of the marker M2, that is, the precision can be improved for extraction of features of the intersections of boundaries forming different color areas.

For example, the intersections of boundaries forming different color areas of the marker M2 illustrated in FIG. 13 (hereinafter, called intersections) are a total of five points including the one center point of the pattern of the circular part of the marker M2 and four points appearing on the circumference of the circular part of the marker M2. It means that the extraction of all intersections of the marker M2 as the features excluding the center one point of the pattern of the circular part of the marker M2 allows extraction of the total of five features from an image of the one captured marker M2. Therefore, stable calibration may be implemented even when areas are not available for a plurality of markers.

For example, the aforementioned publicly known art may be used to extract all intersections of different colors of the marker M2 illustrated in FIG. 13 as features. For example, according to the publicly known art, from the image of the captured marker M1 illustrated in FIG. 12, the boundaries of the color areas are detected, and the intersection of two boundaries are extracted as a feature.

Therefore, according to the publicly known art, like the marker M1 illustrated in FIG. 12, the center of the circular part may be extracted as a feature from an image of the captured marker M2 illustrated in FIG. 13. The publicly known art extracts a curved line of the circumference part in addition to a straight line which is the boundary of different colors when four points appearing on the circumference of the circular part of the marker M2 are extracted as features.

However, on the image having the captured marker M2, the curved line corresponding to the circumference of the circular part of the marker M2 may be a distorted curved line which is not an arc in some positional relationship between the position of the camera and the position of the marker M2. This may prevent extraction of four points appearing on the circumference of the circular part of the marker M2 as features according to the publicly known art. In particular, because the marker is often provided at a horizontally remote position from the front of the camera, the image of a captured object may have more distortion as its distance from the front of the camera increases. Such a distorted image acquired as the marker image may result in a lower precision of extraction of features from the image. For example, when the feature extraction is implemented by filter matching, for example, the distorted image matched with the filter may prevent feature detection.

Moreover, when the image of the marker M2 may be distorted under an influence of a lens or when the image of the marker M2 may be unclear under an influence of illumination, boundaries and/or intersections of different colors within the image may be unclear. Also in this case, the publicly known art may not allow stable extraction of four points on the circumference of the marker M2.

Figure 14:
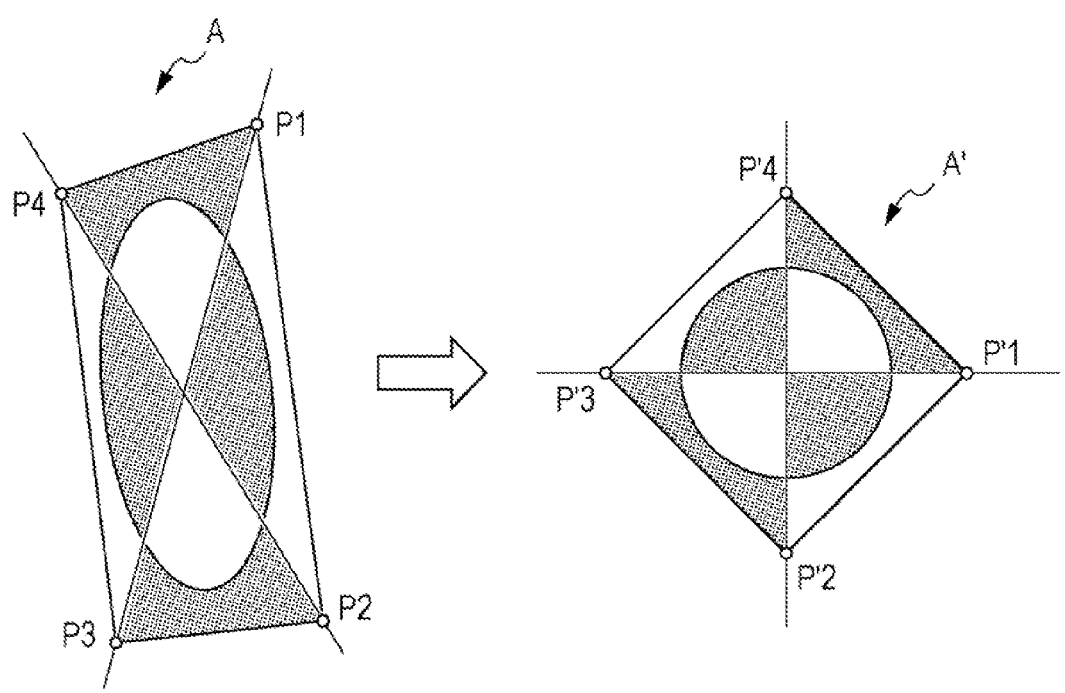
FIG. 14 is used for explaining one methodology which extracts four points on the circumference of a marker in a stable manner.

Accordingly, the distortion of the acquired image may be corrected for stable extraction of features. With reference to FIG. 14, one methodology, for example, will be described which extracts four points on the circumference of the marker M2 in a stable manner. FIG. 14 is used for explaining one methodology which extracts four points on the circumference of the marker M2 in a stable manner.

For example, when an image A of the distorted marker M2 as illustrated in FIG. 14 is acquired, the feature extraction may be implemented by converting the image to an image A' illustrated in FIG. 14 without distortion. First of all, by using the publicly known art, a segment P1P3 and a segment P2P4 which are crossing boundaries of the marker M2 illustrated in FIG. 14 are detected from the image A. The quadrangle P1P2P3P4 illustrated in FIG. 14 is then converted to a square P1'P2'P3'P4' as illustrated in FIG. 14. The conversion has been known as projection transformation, or homography. (Refer to Sato et al., "Konpyuta Bijon, Shikaku no Kikagaku (Computer Vision, Visual Geometry)", Corona, 1999). Projection transformation is executed such that the crossing angle of the segments detected in the original image can be 90 degrees. In other words, if segments which do not cross at 90 degrees are detected on the original image, the converted image is not an image with the distortion cancelled.

If, as illustrated in FIG. 14, the image A of the distorted marker M2 may be converted to the image A' with the distortion cancelled, the publicly known art may be applied to detect the curved line of the circumference and extract four points on the circumference from the intersections the curved line of the circumference and the two segments. However, even the aforementioned methodology is used, technical difficulties in extraction of the curved line and the low precision for extraction with an unclear image still remain, preventing stable extraction of four points on the circumference of the marker M2.

Figure 15:
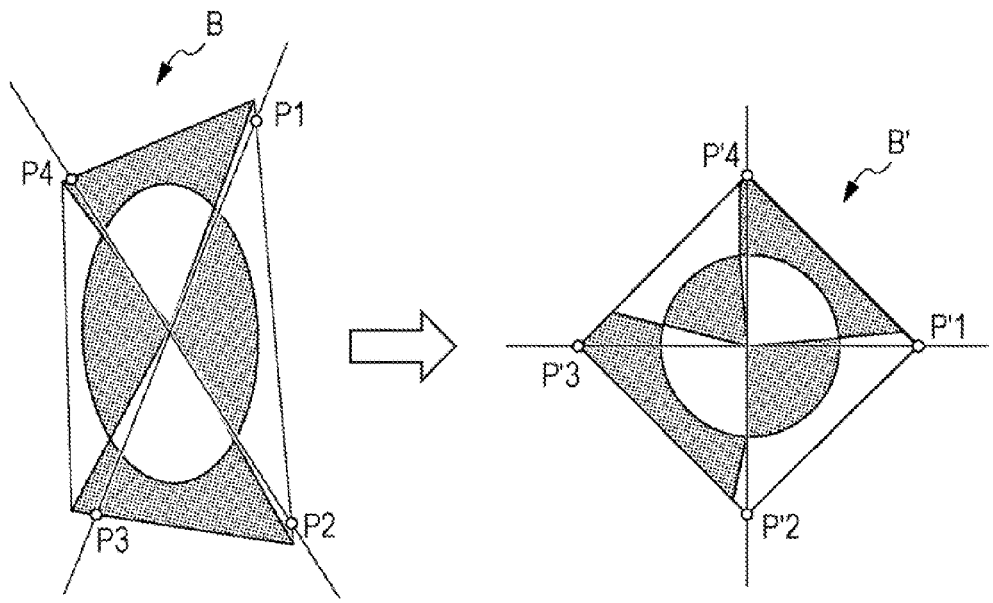
FIG. 15 is used for explaining the problems of the methodology described with reference to FIG. 14.
Figure 16:
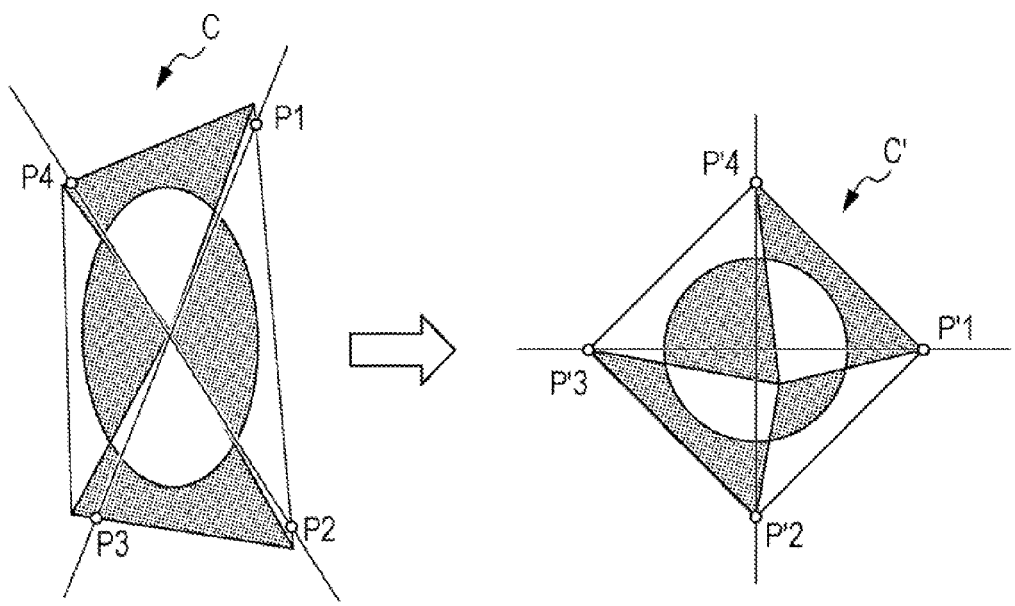
FIG. 16 is used for explaining the problems of the methodology described with reference to FIG. 14.

The methodology described with reference to FIG. 14 has further problems as illustrated in FIG. 15 and FIG. 16, for example. FIG. 15 and FIG. 16 are used for explaining the problems of the methodology described with reference to FIG. 14. The methodology described with reference to FIG. 14 assumes that the crossing boundaries (segment P1P3 and segment P2P4) of the marker M2 are straight lines.

However, even when a segment crossing the center is detected as in the image B of the marker M2 illustrated in FIG. 15, the segment may not agree with the boundaries of the areas because the lens distortion is nonlinear and/or the image may be unclear due to an influence of illumination. For example, when boundaries extending in both directions from the center are acquired as different straight lines from the center on the original image, the segment extracted as the boundary is a part of an approximate straight line of the two different segments. Also when a boundary is acquired as a curved line because of distortion of the original image, the segment extracted as a boundary is a straight line approximation of the curved line. Under this condition, the conversion of the quadrangle P1P2P3P4 to the square P1'P2'P3'P4' results in an image in which the crossing boundaries of the marker M2 are largely distorted, as in the image B' illustrated in FIG. 15, for example.

Even the conversion of the quadrangle P1P2P3P4 formed by connecting four corner points P1 to P4 of the marker M2 on the image C of the marker M2 illustrated in FIG. 16 to the square P1'P2'P3'P4' may result in the image C' as illustrated in FIG. 16. In other words, also in this case, the image is distorted like the image B' illustrated in FIG. 15. This is caused by the fact that the crossing boundaries of the marker M2 on the image C of the marker M2, that is the diagonal lines of the quadrangle P1P2P3P4 may not be straight lines for the same reason as in the case illustrated in FIG. 15. In both cases illustrated in FIG. 15 and FIG. 16, the image of the marker M2 after the standardization conversion is still distorted. Therefore, the methodology described with reference to FIG. 14 may not allow stable extraction of four points on the circumference of the marker M2.

An embodiment for stable extraction of a plurality of features from an image of one captured marker will be described in view of the problems described with reference to FIG. 15 and FIG. 16.

Configuration of Image Processing Apparatus (First Embodiment)

Figure 1:
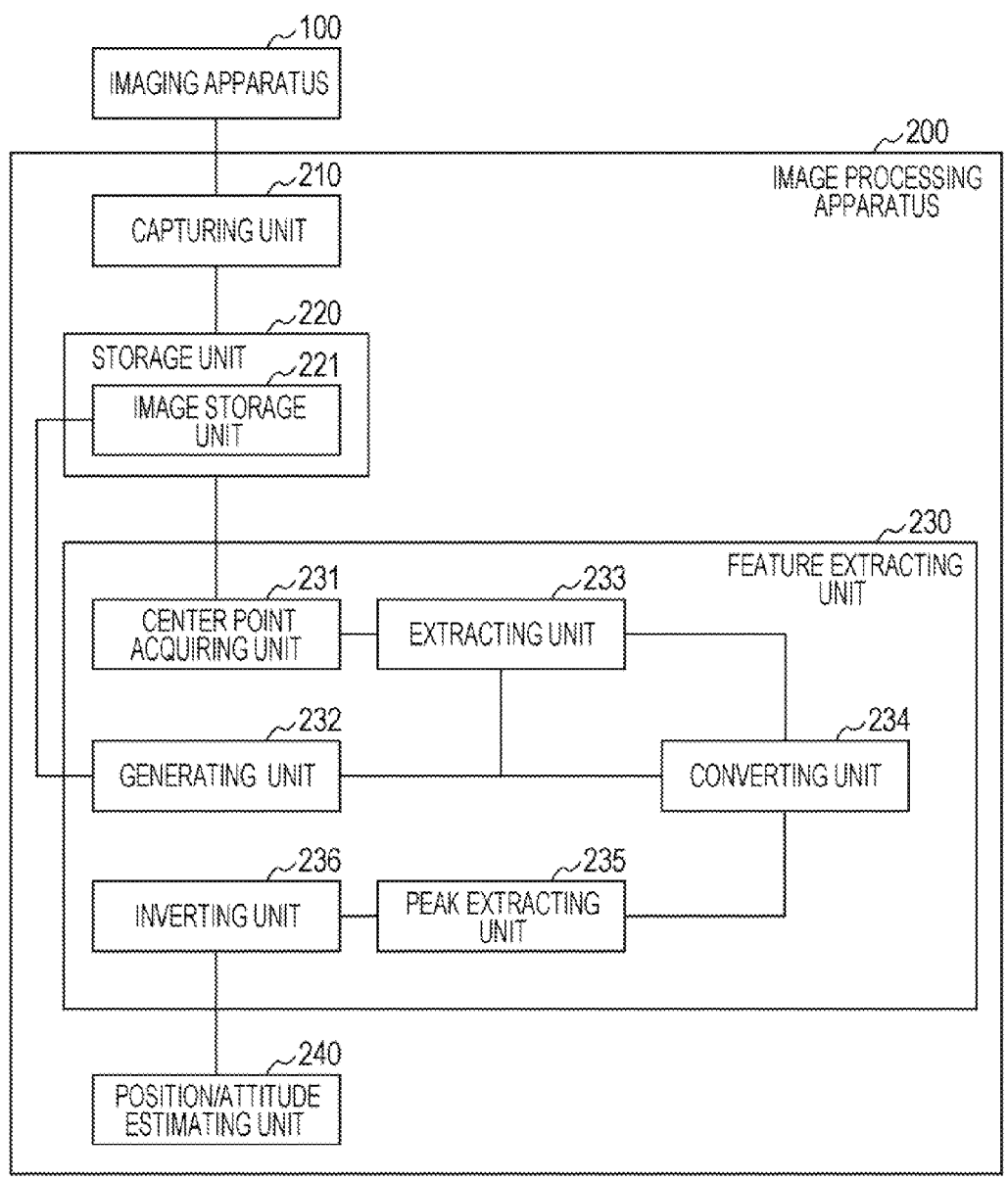
FIG. 1 is a function block diagram illustrating the configuration of an image processing apparatus according to a first embodiment.

FIG. 1 is a function block diagram illustrating the configuration of an image processing apparatus according to a first embodiment. As illustrated in FIG. 1, an image processing apparatus 200 according to the first embodiment connects to an imaging apparatus 100. The imaging apparatus 100 captures an image of a marker provided at a predetermined position.

Figure 2:
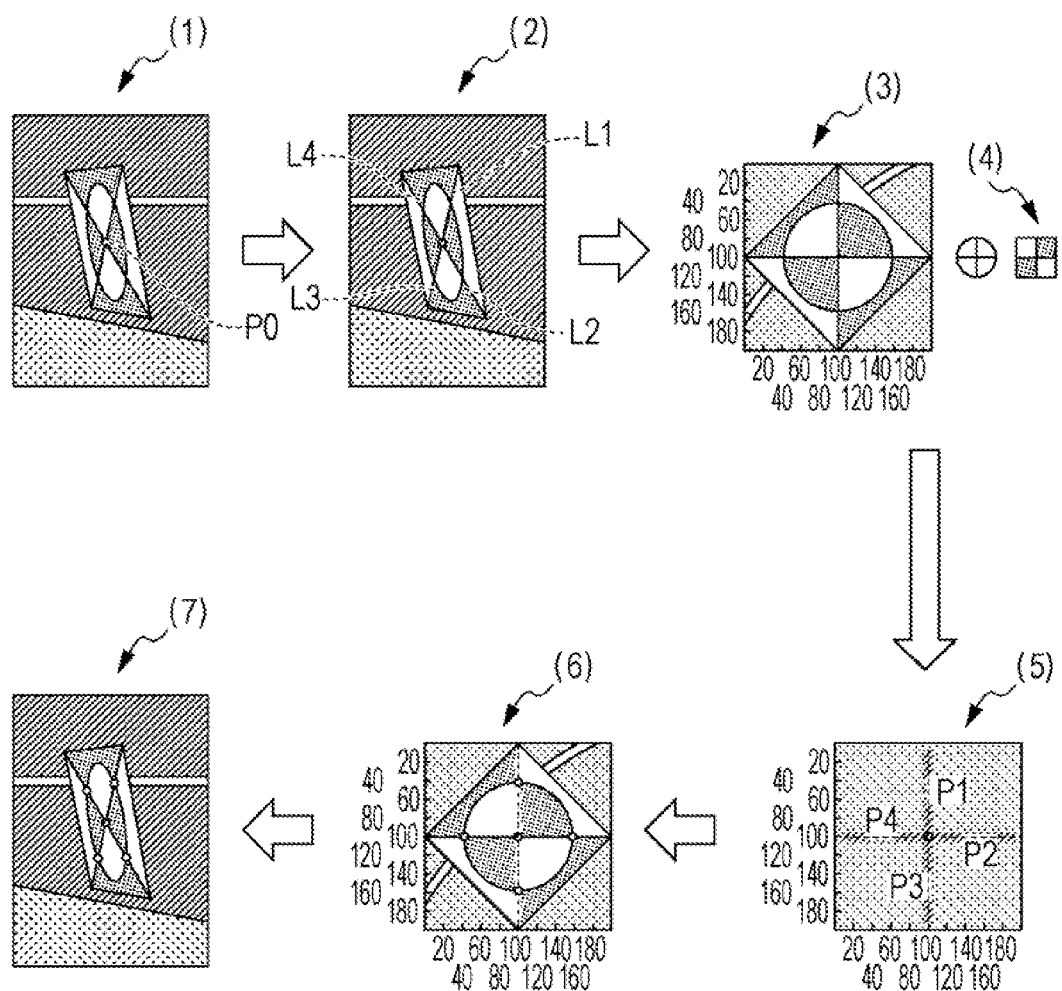
FIG. 2 is used for explaining an image processing apparatus according to the first embodiment.

As illustrated in FIG. 1, the image processing apparatus 200 has an acquiring unit 210, a storage unit 220, a feature extracting unit 230, and a position/attitude estimating unit 240. The image processing apparatus 200 acquires the image of the marker captured by the imaging apparatus 100 and extracts a plurality of features from the acquired image. Before describing with reference to FIG. 1, the image processing apparatus 200 will be described with reference to FIG. 2. FIG. 2 is used for explaining an image processing apparatus according to the first embodiment. FIG. 2 illustrates the progress of processing by the image processing apparatus.

For example, the image processing apparatus 200 uses the marker M2 as a marker to be used for the extraction of features. The marker M2 has a circular part at the center of a 40 centimeter square, for example and has a pattern having white areas and black areas alternately. The circular part of the marker M2 has a pair of white areas facing across the center of the marker M2 and a pair of black areas facing across the center of the marker M2. The marker M2 having a pattern having white areas and black areas alternately is for clear appearance of the center of the circular part of the marker M2 as a feature on the image of the marker M2. The area surrounding the circular part of the marker M2 also having white areas and black areas alternately is for clear appearance of the boundaries of the circular part of the marker M2 on the image of the marker M2 independent of the influence of the image relating to the surface of the floor or the background where the marker M2 is placed.

The image processing apparatus 200 is not limited to the case where the marker M2 illustrated in FIG. 13 is used. The marker M1 illustrated in FIG. 12 may be used. For example, the circular part of the marker M2 may be changed to a quadrangle like the marker M1 illustrated in FIG. 12. As a whole, a quadrangle marker may be used in which the quadrangle area is surrounded by another area and which has a pattern having white areas and black areas alternately as a whole.

Referring back to FIG. 2, the image processing apparatus 200, acquires on the grayscale image resulting from the conversion of luminance values of the pixels of the image of the captured marker M2, the position of the center point P0 of the marker M2, as referred by (1). Next, the image processing apparatus 200 acquires the positions of the boundaries L1, L2, L3, and L4 of the white areas and black areas extending radially from the center point P0 on the grayscale image, as referred by (2). The image processing apparatus 200 then performs standardization conversion to correct the distortion of the grayscale image on the basis of the position of the center point P0 and the positions of the boundaries L1, L2, L3, and L4, as referred by (3). The image processing apparatus 200 uses a filter through which the response value to be acquired increases as the possibility that the intersection where a boundary forming a white area and a boundary forming a black area cross exists increases to scan the standardization-converted image and acquire the response value of the filter, as referred by (4).

The image processing apparatus 200 next extracts the position having the peak response value of the filter, as referred by (5) in FIG. 2. The image processing apparatus 200 then acquires the position having the peak response value of the filter on the standardization-converted image, as referred by (6). The image processing apparatus 200 inverts the standardization-converted image to the grayscale image acquires the position on the grayscale image corresponding to the position having the peak response value of the filter on the standardization-converted image, as referred by (7). The image processing apparatus 200 then determines a feature of the position on the acquired grayscale image.

Referring back to FIG. 1, the acquiring unit 210 acquires the image of the marker M2 captured by the imaging apparatus 100. The acquiring unit 210 stores the acquired image of the marker M2 to the storage unit 220.

The storage unit 220 has an image storage unit 221, as illustrated in FIG. 1. The storage unit 220 may be a semiconductor memory device such as a RAM (Random Access Memory) and a flash memory. The image storage unit 221 stores the image of the marker M2 acquired by the acquiring unit 210.

A feature extracting unit 230 has a center point acquiring unit 231, a generating unit 232, an extracting unit 233, a converting unit 234, a peak extracting unit 235 and an inverter unit 236, as illustrated in FIG. 1. The feature extracting unit 230 may correspond to an electronic circuit or an integrated circuit, for example. The electronic circuit may be a CPU (Central Processing Unit) or an MPU (Micro Processing Unit), for example. The integrated circuit may be an ASIC (Application Specific Integrated Circuit) or an FPGA (Field Programmable Gate Array), for example.

The center point acquiring unit 231 acquires an image of the marker M2 from the image storage unit 221 (hereinafter, called an "original image") and acquires the position of the center point of the marker M2 where a white area and a black area cross on the original image. For example, the center point acquiring unit 231 detects edges of the original image and acquires the position of the point that is close to the center of the marker M2 as the position of the center point, among points where the detected edges cross.

Alternatively center point acquiring unit 231 may repeatedly degenerate the color areas of the white areas and black areas of the marker M2 on the original image to a form that is close to an ellipse form and acquire the position of the center point of the marker M2 on the basis of the positional relationship of the degenerated color areas. The present inventor found that the color areas of the circular part of the marker M2 has an elliptical characteristic when it is completely separated from another area within the image of the marker M2. Accordingly, the center point acquiring unit 231 first repeatedly degenerates the color areas of the circular part of the marker M2 until it has an elliptical characteristic. After the degeneration completely separates the color areas of the circular part of the marker M2, the center point acquiring unit 231 acquires the position of the center point of the marker M2 on the basis of the positional relationship of the color areas which face across the center of the marker M2.

The generating unit 232 acquires the original image from the image storage unit 221 and converts the luminance values of the original image to generate the grayscale image. When the original image is an RGB color image, the generating unit 232 may use Expression (1) below for each pixel, for example, to convert R, G, and B values to a luminance value Y and thus generate a grayscale image.

$$Y = 0.299\,R + 0.587\,G + 0.114\,B \quad (1)$$

Figure 3:
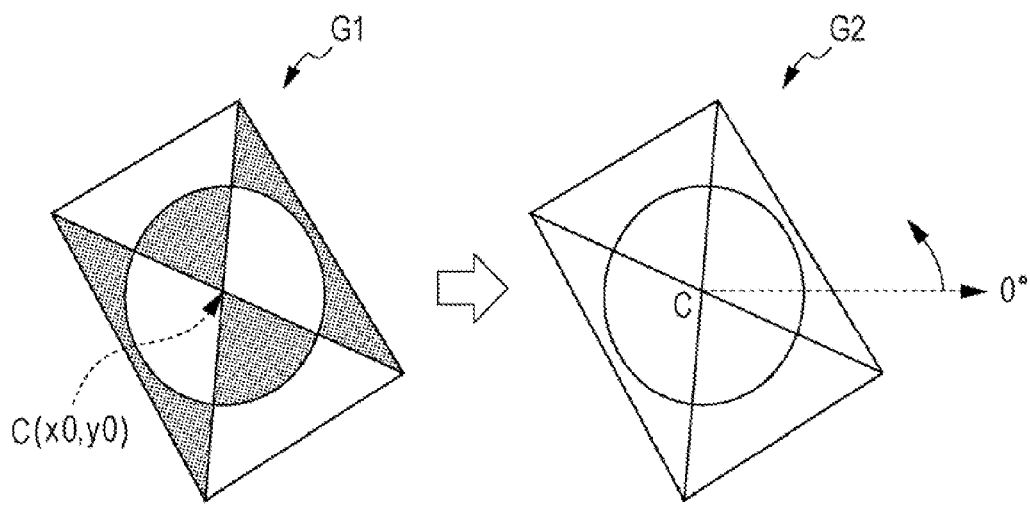
FIG. 3 is used for explaining an extracting unit according to the first embodiment.
Figure 4:
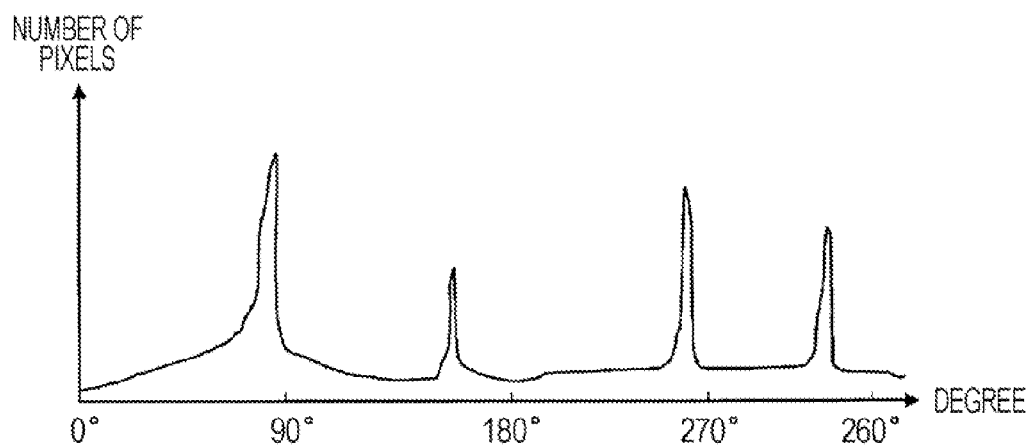
FIG. 4 is used for explaining the extracting unit according to the first embodiment.

The extracting unit 233 acquires for each radiation the positions of the boundaries between white areas and black areas extending radially from the center of the marker M2 on the grayscale image generated by the generating unit 232 as the angle of elevation at a predetermined position from the center. With reference to FIG. 3 and FIG. 4, the extracting unit 233 will be described below. FIG. 3 and FIG. 4 are used for explaining an extracting unit according to the first embodiment.

FIG. 3 illustrates a grayscale image G1. FIG. 3 further illustrates the center point C (x0,y0) of the marker M2 in the grayscale image G1, which will be called a "center point C" in the description of this embodiment. FIG. 3 further illustrates an edge image G2.

As illustrated in FIG. 3, the extracting unit 233 uses a publicly known art to detect edges of the grayscale image G1 to acquire the edge image G2. The publicly known art may include scanning the grayscale image G1 with an edge detection filter such as Canny operator to detect the edges or binarizing the grayscale image G1 and then detecting pixels on the boundaries of the white areas and black areas, for example. The extracting unit 233 next sets the direction of 0 degree arbitrarily to the edge image G2. The extracting unit 233 then extracts the angle directions of the edges counterclockwise from the direction of 0 degree about the center point C. As illustrated in FIG. 4, the extracting unit 233 generates a histogram of counted number of pixels detected as an edge for each of the angular directions of the edges. The extracting unit 233 acquires four position having a peak number of pixels in the histogram illustrated in FIG. 4 as the positions of the four boundaries between the white areas and black areas extending radially from the center point C of the marker M2.

Figure 5:
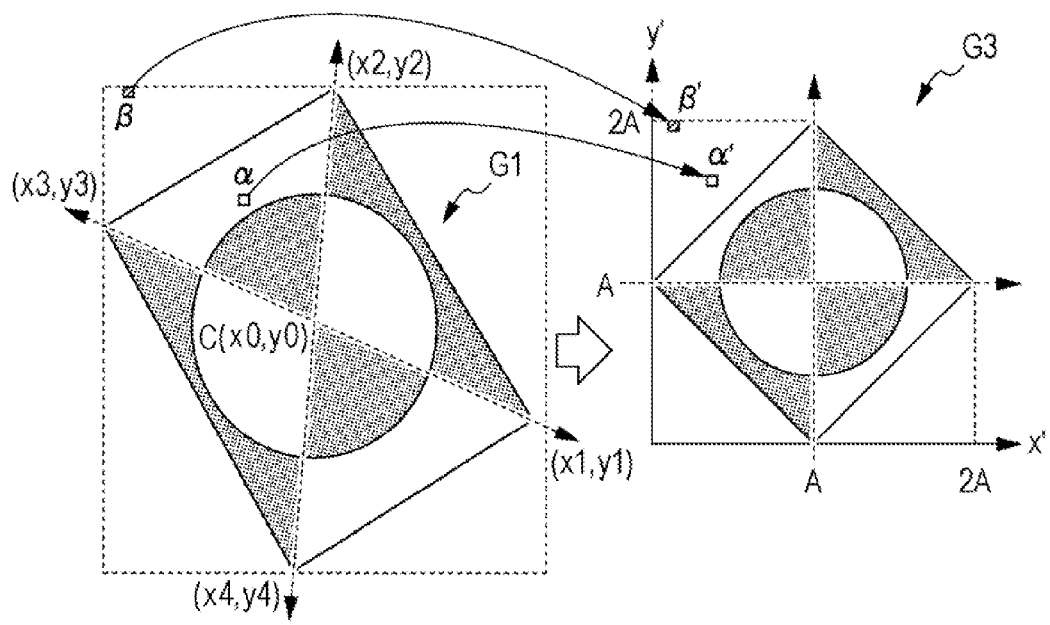
FIG. 5 is used for explaining a converting unit according to the first embodiment.

The converting unit 234 uses the position of the center point C and the positions of the four boundaries for standardization conversion to correct the distortion of the grayscale image G1. For example, the converting unit 234 performs standardization conversion on the grayscale image G1 such that adjacent two boundaries can be orthogonal at the position of the center point C. In other words, it considers that the boundaries of the white areas and black areas are orthogonal at the center of the marker M2. With reference to FIG. 5, the converting unit 234 will be described below.

FIG. 5 is used for explaining a converting unit according to the first embodiment. FIG. 5 illustrates a standardized image G3. FIG. 5 further illustrates four coordinates (x1,y1), (x2,y2), (x3,y3), and (x4,y4) which are away from the center point C in the directions of the corresponding boundaries by a predetermined distance. The predetermined distance desirably extend to the corresponding end of the marker M2 and may be preset on the basis of the size of the marker M2, for example. Alternatively, the predetermined distance may be two or three times of the distance between the barycenter position of a white (or black) area of the marker M2 and the center point C. The two or three times may allow reach to the corresponding edge of the marker M2 though it depends on the proportion between the size of the marker M2 and the size of the circular part of the marker M2 and the precision for extraction of the barycenter position. The barycenter position extracting method may be a publicly known area-based method. Though the pixels included within the broken frame illustrated on the left side of FIG. 5 will be described as a subject of the conversion below, the present invention is not limited thereto. For example, the pixels included in the area surrounded by the coordinates (x1,y1), (x2,y2), (x3,y3), and (x4,y4) may be handled as a subject of the conversion for higher processing speed.

FIG. 5 further illustrates points (pixel) "α" and "β" in the grayscale image G1 and points (pixels) "α'" and "β'" corresponding to "α" and "β" on the standardized image G3.

First, the converting unit 234 acquires the grayscale image G1 and acquires the coordinates (X0,Y0) of the center point C of the marker M2 and coordinates (x1,y1), (x2,y2), (x3,y3), and (x4,y4) on the boundaries of the marker M2. The converting unit 234 then determines the image size (such as 2A) after the standardization and allocates a buffer that stores the positions of the points (pixels) on the standardized image G3. For each of areas of the grayscale image G1 divided by four boundaries, the converting unit 234 then arranges the pixel values of the pixels within the area to the corresponding pixels on the standardized image G3 to convert the grayscale image G1 to the standardized image G3, as illustrated in FIG. 5. For example, the conversion may be expressed by Expression (2) using the matrix H:

$$\begin{bmatrix} x \\ y \end{bmatrix} = H \begin{bmatrix} x' \\ y' \\ 1 \end{bmatrix} \quad (2)$$

where the coordinates of a point on the grayscale image G1 are (x,y) and the coordinates corresponding to the coordinates (x,y) of the point on the standardized image are (x',y').

For example, the converting unit 234 handles the four areas of the standardized image separately and calculates the matrix H that formulates the correspondence relationship between the coordinates (x,y) and coordinates (x',y') in each of the areas. In this case, the converting unit 234 defines the following prerequisites. Hereinafter, the grayscale image G1 will be called an "image G1", and the standardized image G3 will be called an "image G3". The converting unit 234 defines that the coordinates (x0,y0), (x1,y1), (x2,y2), (x3,y3) and (x4,y4) on the image G1 correspond to the points (A,A), (2A,A), (A,2A), (0,A) and (A,0) on the image G3, respectively. On the image G3 standardized under the defined prerequisites, the angle formed by the straight line at X=A and the straight line at Y=A is 90 degrees. In this case, 2A refers to the length of one side of the square of the standardized image, that is, corresponds to the size of the standardized image. A predetermined value (such as A=100) may be given thereto.

For example, if the coordinates (x',y') on the standardized image are within the area of "A≦x'≦2A and A≦y'≦2A" among the four areas of the standardized image, the converting unit 234 calculates the matrix H by the following Expression (3).

$$H = \begin{bmatrix} \frac{x_1-x_0}{A} & \frac{x_2-x_0}{A} & -(x_1-x_0)-(x_2-x_0)+x_0 \\ \frac{y_1-y_0}{A} & \frac{y_2-y_0}{A} & -(y_1-y_0)-(y_2-y_0)+y_0 \end{bmatrix} \quad (3)$$

If the coordinates (x',y') on the standardized image are within the area of "0≦x'<A and A≦y'≦2A" among the four areas of the standardized image, the converting unit 234 calculates the matrix H by using the following Expression (4).

$$H = \begin{bmatrix} -\frac{x_3-x_0}{A} & \frac{x_2-x_0}{A} & (x_3-x_0)-(x_2-x_0)+x_0 \\ \frac{y_3-y_0}{A} & \frac{y_2-y_0}{A} & (y_3-y_0)-(y_2-y_0)+y_0 \end{bmatrix} \quad (4)$$

If the coordinates (x',y') on the standardized image are within the area of "0≦x'<A and 0≦y'<A" among the four areas of the standardized image, the converting unit 234 calculates the matrix H by using the following Expression (5).

$$H = \begin{bmatrix} -\frac{x_3-x_0}{A} & \frac{x_4-x_0}{A} & (x_3-x_0)+(x_4-x_0)+x_0 \\ -\frac{y_3-y_0}{A} & \frac{y_4-y_0}{A} & (y_3-y_0)+(y_4-y_0)+y_0 \end{bmatrix} \quad (5)$$

If the coordinates (x',y') on the standardized image are within the area of "A≦x'≦2A and 0≦y'<A" among the four areas of the standardized image, the converting unit 234 calculates the matrix H by using the following Expression (6).

$$H = \begin{bmatrix} \frac{x_1-x_0}{A} & \frac{x_4-x_0}{A} & -(x_1-x_0)+(x_4-x_0)+x_0 \\ \frac{y_1-y_0}{A} & \frac{y_4-y_0}{A} & -(y_1-y_0)+(y_4-y_0)+y_0 \end{bmatrix} \quad (6)$$

The converting unit 234 then substitutes the matrix H calculated by one of the Expressions (3) to (6) into Expression (2) and uses Expression (2) to calculates the coordinates (x,y) on the image G1. The converting unit 234 acquires the pixel value of the coordinates (x,y) on the image G1 and stores the acquired value to the buffer as the pixel value of the coordinates (x',y') on the image G3 corresponding to the coordinates (x,y) on the image G1. Through the processing described above, the conversion by the converting unit 234 completes.

Figure 6:
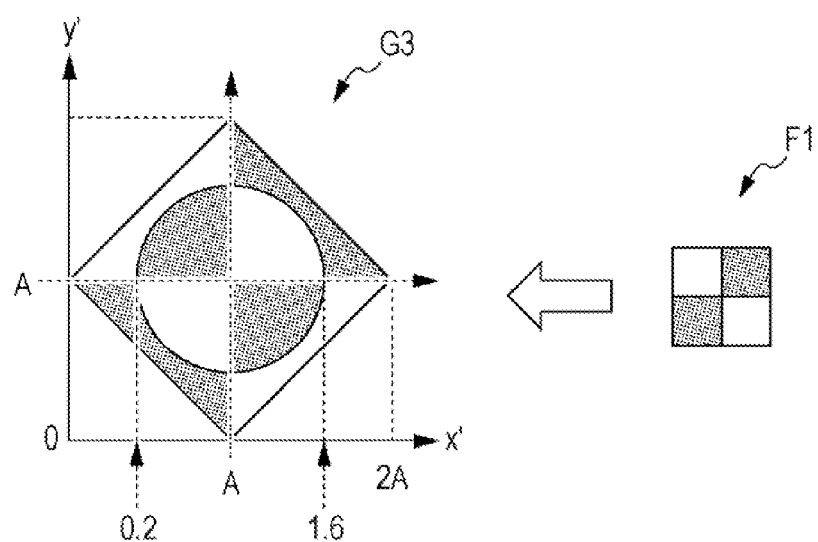
FIG. 6 is used for explaining a peak extracting unit according to the first embodiment.
Figure 7:
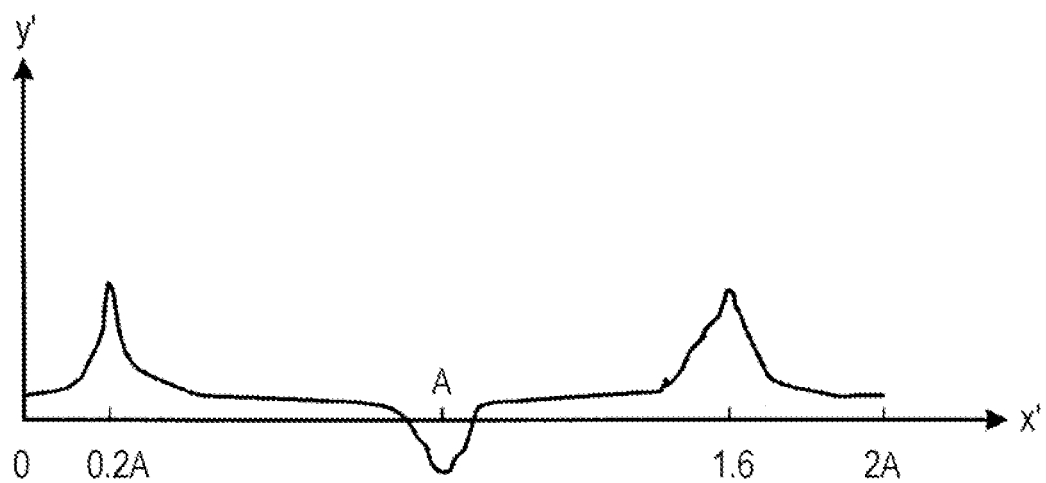
FIG. 7 is used for explaining the peak extracting unit according to the first embodiment.

Referring back to FIG. 1, the peak extracting unit 235 uses a filter through which the response value to be acquired increases as the possibility that an intersection between a white area and a black area exists increases to scan the standardization-converted image, acquires the response values of the filter and acquires the peak of the acquired response values. Hereinafter, with reference to FIG. 6 and FIG. 7, the peak extracting unit 235 will be described. FIG. 6 and FIG. 7 are used for explaining the peak extracting unit 235 according to the first embodiment.

FIG. 6 illustrates a filter F1 through which the response value to be acquired increases as the possibility that an intersection between a white area and a black area exists increases and may correspond to a filter which extracts "Haar-Like features" as a filter pattern, for example.

For example, the peak extracting unit 235 acquires the standardized image G3 and determines a size K of the filter F1. The size K of the filter F1 may properly be in the order of one-tenth of the standardized image G3, for example. The peak extracting unit 235 next determines the width B of the filter's target area. The width B of the filter's target area may properly be half of the size K of the filter F1, for example, and may only be required to perform filtering so as to at least include the intersection between a white area and a black area on the circumference of the marker M2.

The peak extracting unit 235 then defines an area 1, an area 2, an area 3 and an area 4 as filter's target areas. For example, in order to scan on the y' axis and x' axis with the width B, the peak extracting unit 235 defines the range of the areas 1 to 4 as follows.

area 1: A<x'<2A, A−B<y'<A+B
area 2: 0<x'<A, A−B<y'<A+B
area 3: A−B<x'<A+B, A<y'<2A
area 4: A−B<x'<A+B, 0<y'<A The peak extracting unit 235 uses the filter F1 having the size K to scan the filter's target areas (area 1 to area 4) and acquires coordinates (x',y') of the point on the standardized image G3 having the peak response value of the filter in the areas. FIG. 7 illustrates an example of the filter response when the X-axis is scanned, for example. As illustrated in FIG. 7, the response values of the filter have its peak (maximum value) when the values of x' are 0.2A and 1.6A. The response value of the filter when the value of x' is 1.6A is the value acquired when the area 1 is processed as a filter's target area. The response value of the filter when the value of x' is 0.2A, the value acquired when the area 2 is processed as a filter's target area. Accordingly, when the area 1 is processed as the filter's target area, the peak extracting unit 235 acquires (x',y')=(1.6A,A) as the coordinates of the point on the standardized image G3 with a peak response value of the filter. When the area 2 is processed as the filter's target area, the peak extracting unit 235 acquires (x',y')=(0.2A,A) as the coordinates of the point on the standardized image G3 with a peak response value of the filter. Also when the area 3 and area 4 are processed as the filter's target areas, the peak extracting unit 235 acquires the coordinates of the point on the standardized image G3 with a peak response value of the filter. Even on the image standardized by a method as described above by the converting unit 234, the processing by the peak extracting unit 235 focuses on the boundaries of a white area and a black area are orthogonal as in the marker M2 in a minute area having an intersection between a white area and a black area.

Referring back to FIG. 1, the inverter unit 236 uses Expression (2) above to invert the coordinates of the point on the standardized image G3 with a peak response value of the filter to the coordinates of the point on the grayscale image G1. The inverter unit 236 determines the coordinates acquired as a result of the inversion for the position of a feature on the original image of the marker M2 and transmits them to the position/attitude estimating unit 240.

On the basis of the position (coordinates) of the feature transmitted from the point extracting unit 230, the position/attitude estimating unit 240 calculates the position and attitude of the imaging apparatus 100 which has captured the image of the marker M2. The position/attitude estimating unit 240 may correspond to an electronic circuit or an integrated circuit, for example. The electronic circuit may be a CPU (Central Processing Unit) or an MPU (Micro Processing Unit), for example. The integrated circuit may be an ASIC (Application Specific Integrated Circuit) or an FPGA (Field Programmable Gate Array), for example.

Processing by Image Processing Apparatus (First Embodiment)

Figure 8:
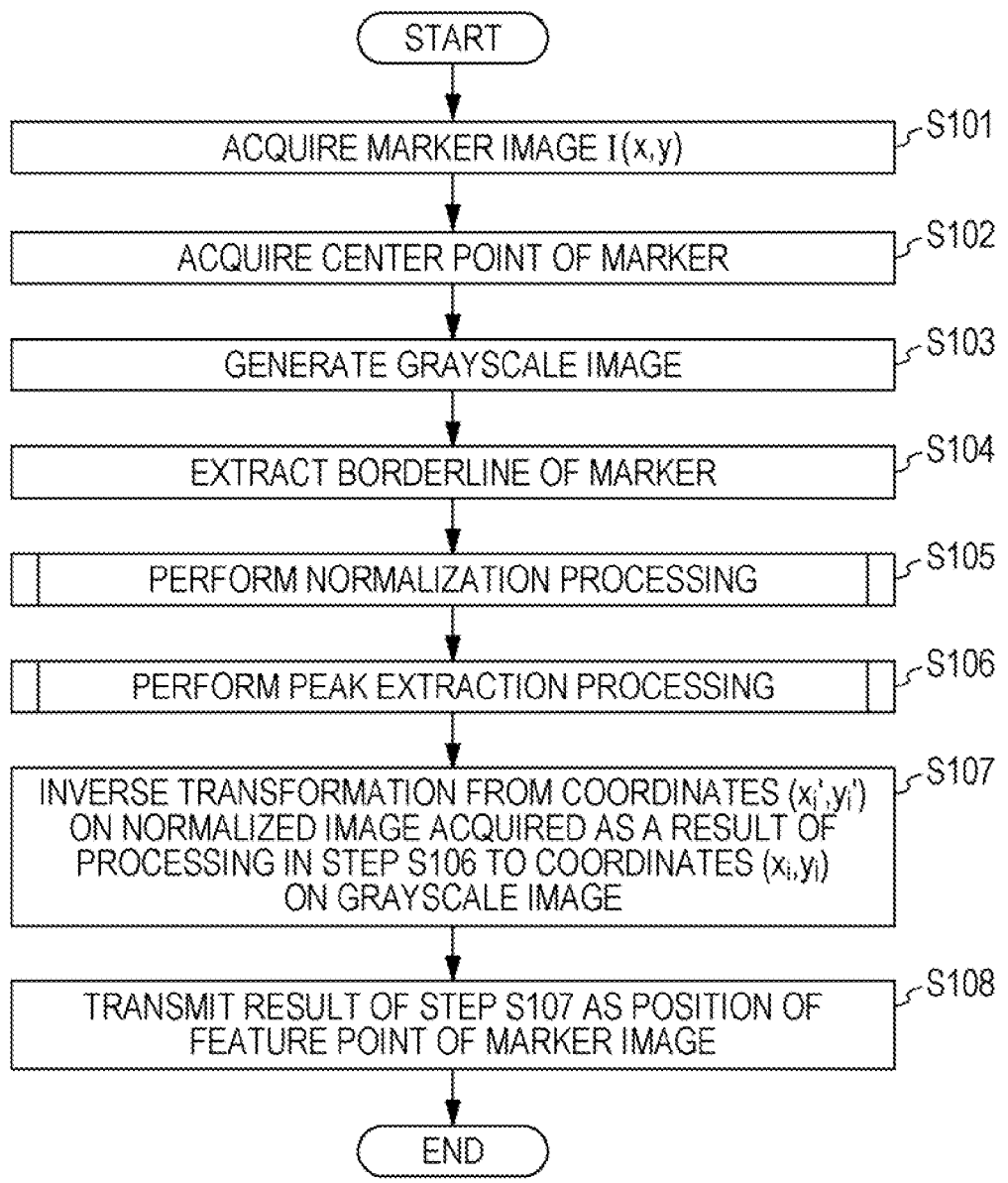
FIG. 8 illustrates an entire flow of processing by an image processing apparatus according to the first embodiment.
Figure 9:
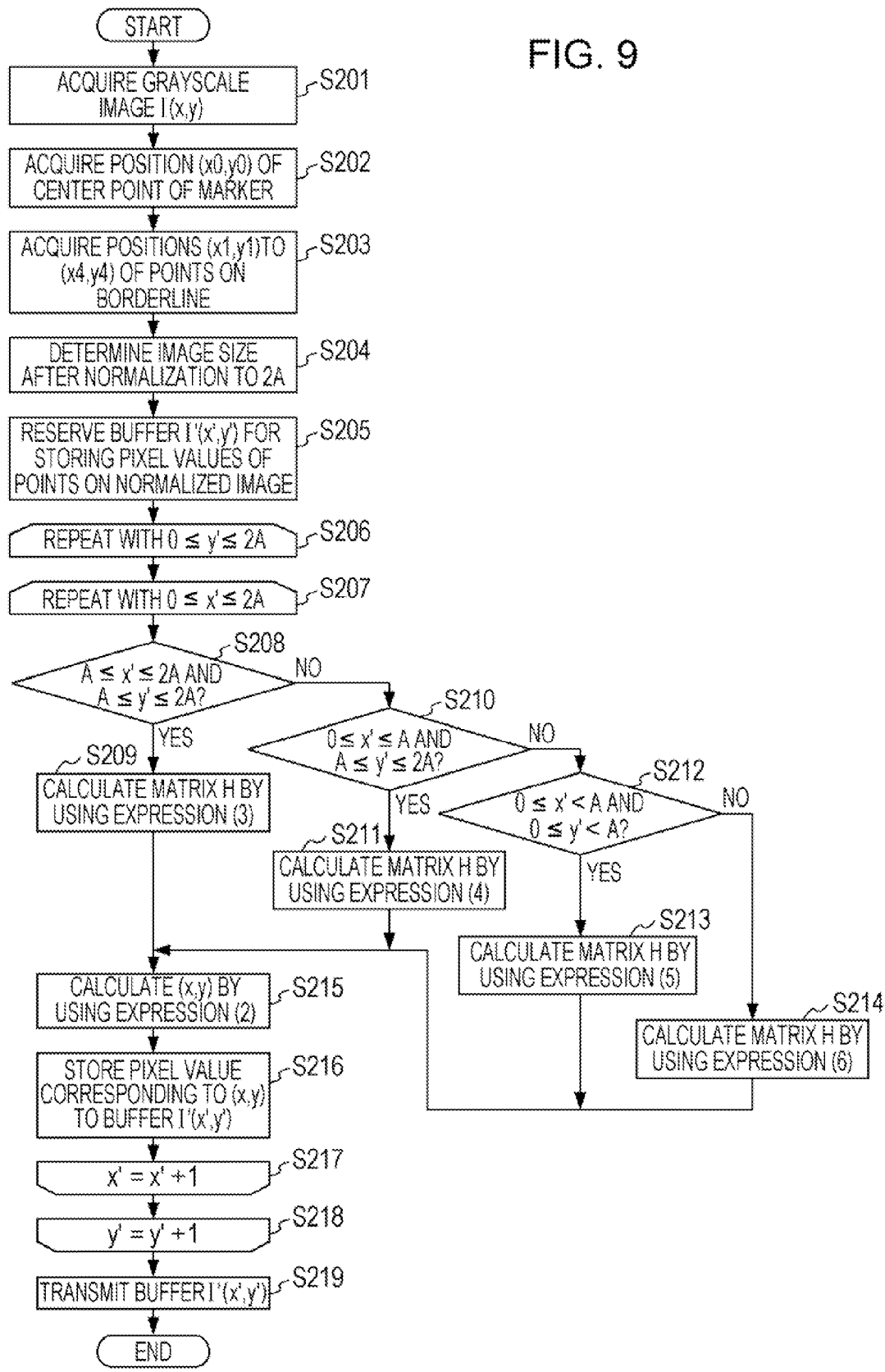
FIG. 9 illustrates a flow of standardization processing according to the first embodiment.
Figure 10:
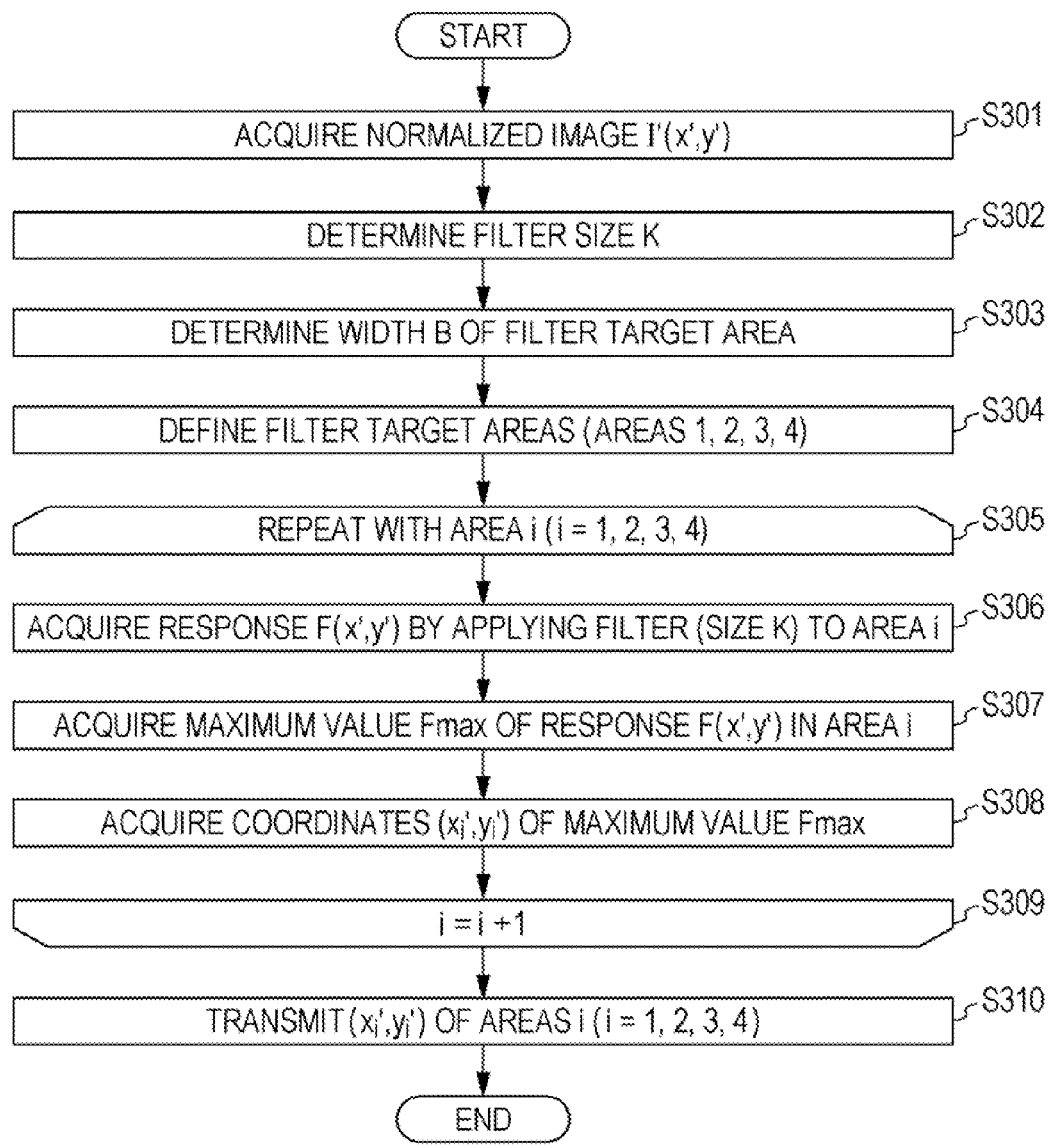
FIG. 10 illustrates a flow of peak extraction processing according to the first embodiment.

With reference to FIG. 8 to FIG. 10, a flow of processing by the image processing apparatus 200 according to the first embodiment will be described. FIG. 8 illustrates an entire flow of processing by an image processing apparatus according to the first embodiment. FIG. 9 illustrates a flow of standardization processing according to the first embodiment. FIG. 10 illustrates a flow of peak extraction processing according to the first embodiment. The image processing apparatus 200 according to the first embodiment performs processing illustrated in FIGS. 8 to 10 every time when an image is acquired. The term, "marker image" which will be described below refers to an original image of the captured marker M2.

First of all, with reference to FIG. 8, an entire flow of processing by an image processing apparatus according to the first embodiment will be described. As illustrated in FIG. 8, the center point acquiring unit 231 acquires an image I (x,y) of the marker from the image storage unit 221 (step S101) and acquires the position of the center point of the marker where a white area and a black area cross (step S102). Next, the generating unit 232 acquires the marker image from the image storage unit 221 and converts the luminance value of the marker image to generate a grayscale image (step S103).

The extracting unit 233 then extracts the positions of the four boundaries between the white areas and black areas extending radially from the center of the marker from the grayscale image generated in step S102 (step S104). The converting unit 234 uses the position of the center point acquired in step S102 and the positions of the four boundaries extracted in step S104 to perform standardization processing which corrects distortion of the grayscale image generated in step S103 (step S105). The standardization processing in step S105 will be described below with reference to FIG. 9.

Next, the peak extracting unit 235 uses a filter through which the response value to be acquired increases as the possibility that an intersection between a white area and a black area exists increases to perform peak extraction processing which scans the standardized image acquired by the standardization processing in step S105 (step S106). The peak extraction processing in step S106 will be described with reference to FIG. 10.

The inverter unit 236 then inverts the coordinates (x'i,y'i) of the point on the standardized image G3 with a peak response value of the filter acquired by the peak extraction processing in step S106 to the coordinates (xi,yi) of the point on the grayscale image G1 (step S107). The inverter unit 236 then determines the result of step S107 as the position of a feature of the marker image and transmits it to the position/attitude estimating unit 240 (step S108).

Next, with reference to FIG. 9, a flow of the standardization processing in step S105 will be described. As illustrated in FIG. 9, the converting unit 234 acquires the grayscale image I(x,y) (step S201). The converting unit 234 next acquires the coordinates (x0,y0) of the center point of the marker (step S202) and acquires the coordinates (x1,y1), (x2,y2), (x3,y3), and (x4,y4) on the boundaries of the marker (step S203). The converting unit 234 then determines the standardized image size as 2A (step S204) and reserves a buffer I'(x',y') for storing the pixel values of the points on the standardized image (step S205).

The converting unit 234 next divides the standardized image to four area and performs the processing in step S206 to step S218. In other words, the converting unit 234 repeatedly performs processing (step S208 to step S216) which calculates the matrix H for each of the four divided areas of the standardized image within the range of $0 \leq x' \leq 2A$ and $0 \leq y' \leq 2A$. Steps S206, S207, S217, and S218 mean that the processing in steps S208 to S216 is repeated by incrementing the x' value and y' value by one within the range of $0 \leq x' \leq 2A$ and $0 \leq y' \leq 2A$.

The converting unit 234 first determines whether the coordinates (x',y') on the standardized image are within the area of "$A \leq x' \leq 2A$ and $A \leq y' \leq 2A$" or not (step S208). If it is determined that the coordinates (x',y') on the standardized image are within the area of "$A \leq x' \leq 2A$ and $A \leq y' \leq 2A$" (Yes in step S208), the converting unit 234 calculates the matrix H by Expression (3) (step S209).

On the other hand, if it is determined that the coordinates (x',y') on the standardized image are not within the area of "$A \leq x' \leq 2A$ and $A \leq y' \leq 2A$" (No in step S208), the converting unit 234 performs the next determination. That is, the converting unit 234 determines whether the coordinates (x',y') on the standardized image are within the area of "$0 \leq x' < A$ and $A \leq y' \leq 2A$" or not (step S210). If it is determined that the coordinates (x',y') on the standardized image are within the area of "$0 \leq x' < A$ and $A \leq y' \leq 2A$" (Yes in step S210), the converting unit 234 calculates the matrix H by Expression (4) above (step S211).

On the other hand, if it is determined the coordinates (x',y') on the standardized image are not within the area of "$0 \leq x' < A$ and $A \leq y' \leq 2A$" (No in step S210), the converting unit 234 performs the next determination. That is, the converting unit 234 determines whether the coordinates (x',y') on the standardized image are within the area of the "$0 \leq x' < A$ and $0 \leq y' < A$" or not (step S212). If it is determined that the coordinates (x',y') on the standardized image are within the area of "$0 \leq x' < A$ and $0 \leq y' < A$" (Yes in step S212), the converting unit 234 calculates the matrix H by Expression (5) above (step S213).

On the other hand, if it is determined that the coordinates (x',y') on the standardized image are not within the area of "$0 \leq x' < A$ and $0 \leq y' < A$" (No in step S212), the converting unit 234 performs the processing as follows. That is, the converting unit 234 determines that the coordinates (x',y') on the standardized image are within the area of "$A \leq x' \leq 2A$ and $0 \leq y' < A$" and calculates the matrix H by Expression (6) above (step S214).

After the matrix H is calculated in one of steps S209, S211, S213, and S214, the converting unit 234 uses Expression (2) above to perform processing in the next step S215. That is, the converting unit 234 uses Expression (2) above to calculate the coordinates (x,y) on the grayscale image I(x,y) corresponding to the coordinates (x',y') on the standardized image (step S215). The converting unit 234 acquires the pixel value of the coordinates (x,y) calculated in step 215 and stores the acquired pixel value in association with the coordinates (x',y') on the standardized image to the buffer I'(x',y') (step S216).

After the processing in step S206 to step S218 completes, the converting unit 234 transmits the data stored in the buffer I'(x',y') to the peak extracting unit 235 (step S219). Through the processing described above, the conversion by the converting unit 234 completes.

Next, with reference to FIG. 10, a flow of the peak extraction processing in step S106 will be described. As illustrated in FIG. 10, the peak extracting unit 235 acquires the standardized image I'(x',y') (step S301) and determines the size K of the filter (step S302). The peak extracting unit 235 then determines the width B of the filter's target area (step S303). The peak extracting unit 235 then defines an area 1, an area 2, an area 3 and an area 4 as the filter's target areas (step S304).

Next, the peak extracting unit 235 performs processing in step S305 to step S309. In other words, the converting unit 234 repeatedly performs the processing in step S306 to step S308 on all of the area 1, area 2, area 3 and area 4 defined in step S304 until the processing completes. Steps S305 and S309 mean that the processing in step S306 to S308 is repeated on all of the area 1, area 2, area 3 and area 4.

The peak extracting unit 235 first applies the filter (size K) to the area i (i=one of 1, 2, 3, and 4) to acquire a response value F(x',y') of the filter (step S306). The peak extracting unit 235 acquires a maximum value Fmax among the response values F(x',y') of the filter acquired for the area i (i=1, for example) (step S307). The peak extracting unit 235 then acquires the coordinates (xi',yi') on the standardized image I'(x',y') corresponding to the maximum value Fmax acquired in step S307 (step S308).

After the processing in step S305 to S309 completes, the coordinates (xi',yi') corresponding to the Fmax of the area i (i=1, 2, 3, 4) to the inverter unit 236 (step S310). Through the processing described above, the peak extracting unit 235 completes the processing.

Advantages of First Embodiment

As described above, the image processing apparatus 200 performs standardization conversion to correct the distortion of a marker image on the basis of the position of the center point on the marker image and the position of the boundary on the marker image. The image processing apparatus 200 then uses a filter through which the response value to be acquired increases as the possibility that an intersection between a white area and a black area exists increases to scan the standardization-converted image and acquires the position on the standardized image with a peak response value of the filter. The image processing apparatus 200 then inverts the standardized image to acquire the position on the grayscale image corresponding to the position on the standardized image with a peak response value of the filter and determines the position as a feature. Therefore, according to the first embodiment, a plurality of features may be extracted from one marker in a stable manner.

According to the first embodiment, standardization conversion is performed on a grayscale image such that the angle formed by boundaries on the marker image can be 90 degrees. Therefore, according to the first embodiment, for example, the distortion of an image of a capture marker in which boundaries are orthogonal to each other may be corrected with high precision.

According to the first embodiment, a filter through which the response value to be acquired increases as the possibility that an intersection between a white area and a black area exists increases to scan a standardized image and acquire the position having a peak response value of the filter within the standardized image. Therefore, according to the first embodiment, the intersection between a white area and a black area which can be a feature on the marker image may be extracted with high precision.

According to the first embodiment, the thus acquired feature is used to calculate the position and/or attitude of the imaging apparatus 100. Therefore, the calibration processing may be performed in a stable manner even on an image of captured one marker.

Second Embodiment

Hereinafter, another embodiment of the image processing program and image processing apparatus disclosed in the subject application will be described.

(1) Configuration of Apparatus and Others

The configuration of function blocks of the image processing apparatus 200 illustrated in FIG. 1, for example, is conceptual and may not be required physically as illustrated. For example, the feature extracting unit 230 and position/attitude estimating unit 240 illustrated in FIG. 1 may be merged functionally or physically. All or parts of function blocks of the image processing apparatus 200 illustrated in FIG. 1 may be distributed or merged functionally or physically in arbitrary units in accordance with a given load or the usage.

(2) Image Processing Program

The processing to be executed by the image processing apparatus 200 according to the aforementioned first embodiment may be implemented by execution of a predetermined program by an electronic apparatus such as a microcomputer provided in an ECU (Electronic Control Unit) mounted in a vehicle, for example. Alternatively, the processing to be executed by the image processing apparatus 200 according to the aforementioned first embodiment may be implemented by execution of a predetermined program in an electronic apparatus such as a microprocessor provided in a robot, for example.

Figure 11:
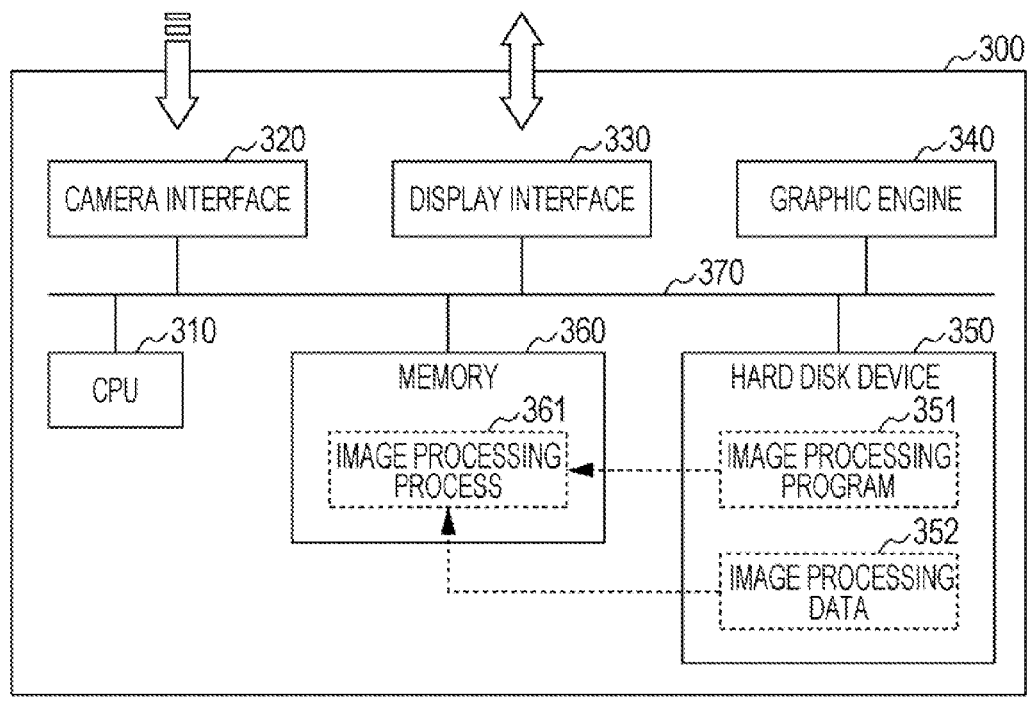
FIG. 11 illustrates an example of an electronic apparatus which executes an image processing program.

Hereinafter, with reference to FIG. 11, there will be described an example of the computer that executes an image processing program which implements the same functions as the processing to be executed by the image processing apparatus 200 according to the aforementioned first embodiment. FIG. 11 illustrates an example of an electronic apparatus which executes an image processing program.

As illustrated in FIG. 11, an electronic apparatus 300 which implements processing to be executed by the image processing apparatus 200 has a CPU (Central Processing Unit) 310 which executes an arithmetic process. As illustrated in FIG. 11, the electronic apparatus 300 further has a camera interface 320 for acquiring a camera image and a display interface 330 for exchanging data with a display. As illustrated in FIG. 11, the electronic apparatus 300 has a graphic engine 340 functioning as a hardware accelerator which generates a synthesized image from a camera image.

As illustrated in FIG. 11, the electronic apparatus 300 further has a hard disk device 350 and a memory 360. The hard disk device 350 stores a program and/or data for implementing processing by the CPU 310, and the memory 360 may be a RAM (Random Access Memory) which temporarily stores information. The apparatuses 310 to 360 are connected to a bus 370.

Instead of the CPU 310, for example, an electronic circuit such as an MPU (Micro Processing Unit) or an integrated circuit such as an ASIC (Application Specific Integrated Circuit) and an FPGA (Field Programmable Gate Array) may be used. Instead of the memory 360, a semiconductor memory device such as a flash memory may be used.

The hard disk device 350 stores an image processing program 351 which has the same functions as the functions of the image processing apparatus 200 and the image processing data 352. The image processing program 351 may be distributed and may be stored in a storage unit in another computer connected communicably over a network.

The CPU 310 may read the image processing program 351 from the hard disk device 350 and expands it to the memory 360 so that, as illustrated in FIG. 11, the image processing program 351 may function as the image processing process 361. The image processing process 361 expands the data such as the image processing data 352 read from the hard disk device 350 to an area allocated on the memory 360, and the processing is executed on the basis of the expanded data.

The image processing process 361 may include processing to be executed in the feature extracting unit 230 in the image processing apparatus 200 illustrated in FIG. 1, such as the processing illustrated in FIG. 8 to FIG. 10.

The image processing program 351 may not be prestored originally in the hard disk device 350. For example, programs may be stored in a "portable physical medium" such as a flexible disk (FD), a CD-ROM, a DVD disk, a magneto-optical disk, and an IC card the supporting drive of which can be connected to an ECU in which the electronic apparatus 300 is provided. The electronic apparatus 300 may read and execute a program from it.

The programs may be stored in "another computer (or server)" connected to an ECU in which the electronic apparatus 300 is provided through a public line, the Internet, a LAN, a WAN or the like. The electronic apparatus 300 may read and execute a program from it.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory storage medium storing an image processing program causing a computer to execute processing of:
   acquiring, on a first image of a captured marker having a pattern formed by a plurality of first areas which has a first color and a plurality of second areas which has a second color that is different from the first color, a position of a first point where the plurality of first areas and the plurality of second areas cross;
   acquiring, on the first image, a boundary between one of the plurality of the first areas and one of the plurality of the second areas having the first point;
   converting the first image to a second image having a plurality of pixels to other positions with pixel values by using the position of the first point, the position of a second point present on the boundary and the positions of the plurality of pixels included in the first image and the pixel values of the plurality of pixels;
   scanning on the second image;
   acquiring an expectation value indicating a possibility that an intersection where the plurality of first areas and the plurality of second areas cross exists excluding the first point;
   acquiring the position of the intersection on the second image on the basis of the expectation value;
   inverting the other positions of the plurality of pixels included in the second image to the corresponding positions on the first image;
   acquiring the position of the first point and the position of the intersection on the first image; and
   determining the acquired position of the first point and the position of the intersection as the positions of features of the pattern.

2. The non-transitory storage medium storing the image processing program according to claim 1, wherein:
   boundaries between the plurality of first areas and the plurality of second areas on are a plurality of segments that are orthogonal to each other at the first point, and the second point is a point present on the plurality of segments, and
   the processing of converting to the second image includes determining the plurality of pixels which are targets of processing of converting the first image to the second image on the basis of distances from the first point to a plurality of the second points and performing projection transformation on the first image to the second image in which a first segment among the plurality of segments and a second segment that is adjacent to the first segment are orthogonal to each other at the first point.

3. The non-transitory storage medium storing the image processing program according to claim 1, wherein the processing of acquiring the position of the intersection includes scanning a filter relating to a form of the intersection in a vicinity of a segment connecting a third point corresponding to the first point on the second image and a fourth point corresponding to the second point on the second image and acquires the position of the intersection on the second image on the basis if the response value of the filter acquired as a result of the scan.

4. The non-transitory storage medium storing the image processing program according to claim 1, wherein the feature is used to further execute the processing of calculating the position and attitude of a camera having captured the marker.

5. An image processing apparatus comprising:
   a center point acquiring unit which, on a first image of a captured marker having a pattern formed by a plurality of first areas which has a first color and a plurality of second areas which has a second color that is different from the first color, acquires the position of a center point of the pattern where the plurality of first areas and the plurality of second areas cross;
   a boundary acquiring unit which acquires the positions of boundaries between the plurality of first areas and the plurality of second area on the first image;
   a converting unit which uses the position of the center point acquired by the center point acquiring unit and the position of the boundary acquired by the boundary acquiring unit to convert the first image to a second image having its image distortion corrected;
   an intersection acquiring unit which scans on the second image, acquires expectation values which are areas including a point where the plurality of first areas and the plurality of second areas cross excluding the center point and acquires the position of the point of the intersection on the second image on the basis of the acquired expectation values; and
   a determining unit which inverts the second image to the first image before its image distortion is corrected so that the position of the center point acquired by the center point acquiring unit and acquires the positions on the first image corresponding to the position of the intersection acquired by the intersection acquiring unit and determines the points corresponding to the acquired positions as features.

6. The image processing apparatus according to claim 1, wherein:

the boundaries between the plurality of first areas and the plurality of second areas on are a plurality of segments that are orthogonal to each other at the first point, and the second point is a point present on the plurality of segments, and the converting unit determines the plurality of pixels which are targets of processing of converting the first image to the second image on the basis of distances from the first point to a plurality of the second points and performs projection transformation on the first image to the second image in which a first segment among the plurality of segments and a second segment that is adjacent to the first segment are orthogonal to each other at the first point.

7. The image processing apparatus according to claim 1, wherein the intersection acquiring unit scans a filter relating to a form of the intersection in a vicinity of a segment connecting a third point corresponding to the first point on the second image and a fourth point corresponding to the second point on the second image and acquires the position of the intersection on the second image on the basis if the response value of the filter acquired as a result of the scan.

8. The image processing apparatus according to claim 1, wherein the feature is used to further execute the processing of calculating the position and attitude of a camera having captured the marker.

* * * * *